US011421930B1

(12) United States Patent
Whitney et al.

(10) Patent No.: US 11,421,930 B1
(45) Date of Patent: Aug. 23, 2022

(54) PORTABLE COOLER WITH INTEGRATED SUPPORT TRAYS

(71) Applicants: Christopher William Whitney, Tampa, FL (US); Vitor Coelho, Tampa, FL (US)

(72) Inventors: Christopher William Whitney, Tampa, FL (US); Vitor Coelho, Tampa, FL (US)

( * ) Notice: Subject to any disclaimer, the term of this patent is extended or adjusted under 35 U.S.C. 154(b) by 310 days.

(21) Appl. No.: 16/814,727

(22) Filed: Mar. 10, 2020

Related U.S. Application Data

(60) Provisional application No. 62/952,380, filed on Dec. 22, 2019.

(51) Int. Cl.
*F25D 3/08* (2006.01)
*F25D 11/00* (2006.01)
*A47G 23/06* (2006.01)
*B62B 1/24* (2006.01)

(52) U.S. Cl.
CPC .............. *F25D 11/00* (2013.01); *A47G 23/06* (2013.01); *B62B 1/24* (2013.01)

(58) Field of Classification Search
CPC ... F25D 3/08; F25D 3/107; F25D 3/14; F25D 11/00; A45C 11/20; A47G 23/06

USPC ....................................................... 220/592.2
See application file for complete search history.

(56) References Cited

U.S. PATENT DOCUMENTS

| | | | |
|---|---|---|---|
| 2003/0038138 A1* | 2/2003 | Komurke | A45C 11/20 220/592.2 |
| 2012/0037643 A1* | 2/2012 | Matt | A45C 11/20 220/592.2 |

* cited by examiner

*Primary Examiner* — King M Chu
(74) *Attorney, Agent, or Firm* — Gulf Coast Intellectual Property Group

(57) ABSTRACT

A portable cooler that is configured to provide a plurality of support trays wherein the support trays are moveable between a first position and a second position. The cooler of the present invention includes a body that is formed having four walls and a bottom creating an interior volume operable to receive objects therein. The exterior surface of the walls of the cooler have integrally formed recesses that are configured to receive the support trays in their first position. The support trays are extended outward from the walls of the cooler body in their second position and are substantially perpendicular to the walls of the body. The support trays are supported by a tray support member wherein the tray support is movably coupled with the cooler body and extends across the width of the support trays being operably coupled to the bottom thereof.

15 Claims, 3 Drawing Sheets

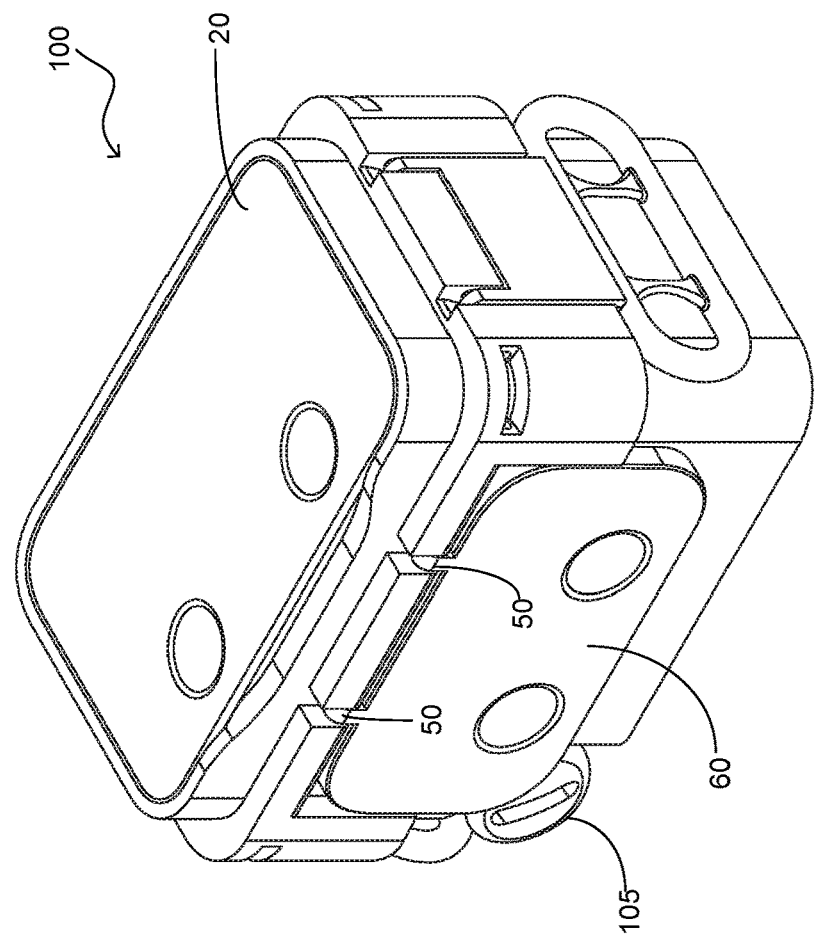
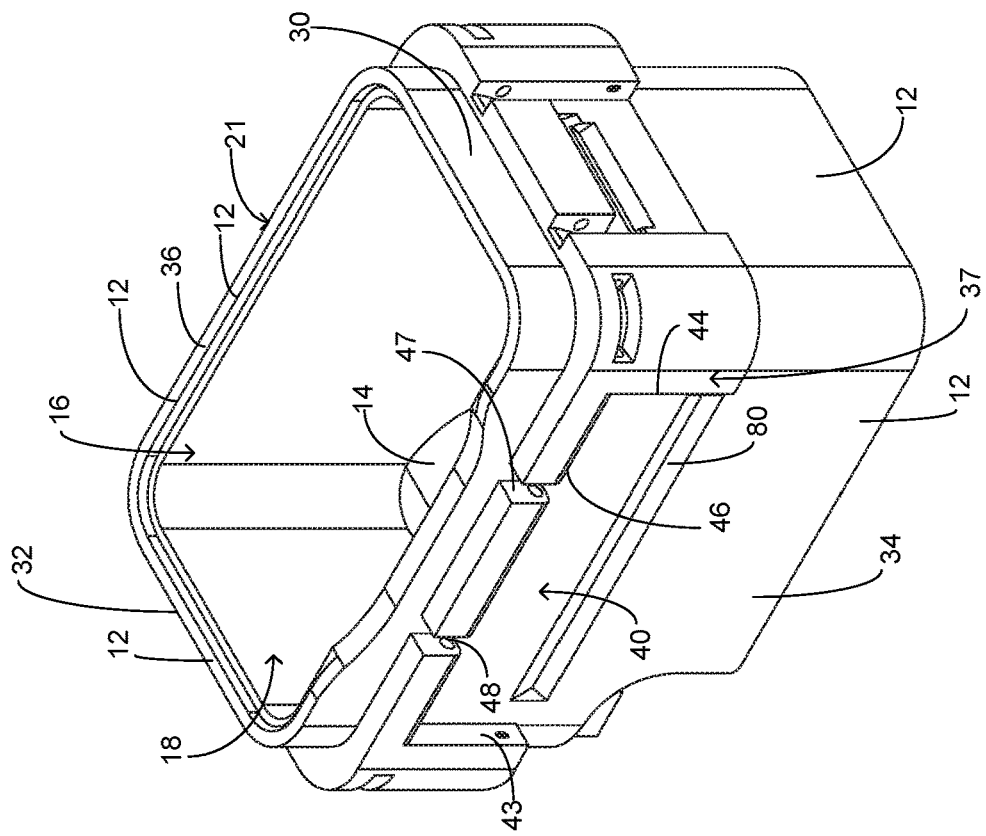
FIG. 4
FIG. 3

PORTABLE COOLER WITH INTEGRATED SUPPORT TRAYS

PRIORITY UNDER 35 U.S.C. SECTION 119(E) & 37 C.F.R. SECTION 1.78

This nonprovisional application claims priority based upon the following prior United States Provisional Patent Application entitled: Cooler with exterior trays and drink holders that are collapsible, but permanently attached to exterior sides and handles, and self-supported by the cooler only, Application No.: 62/952,380 filed Dec. 22, 2019, in the name of Christopher William Whitney and Vitor Coelho, which is hereby incorporated by reference for all purposes.

FIELD OF THE INVENTION

The present invention relates generally to coolers, more specifically but not by way of limitation, a portable cooler that includes integrally formed on the body thereof a plurality of support trays that are configured to be deployed so as to provide support surfaces for objects to be placed or tasks to be executed thereon.

BACKGROUND

Portable coolers are well known in the art. These portable coolers are utilized for numerous types of activities and/or events and are available in various sizes and styles. Some styles available include soft-sided coolers that are designed to be collapsible when not in use for easy storage. Another popular style are hard-sided coolers that include a handle and wheels in order to assist in the transportation thereof. The conventional cooler includes a body having four walls that are integrally formed with a bottom to create an interior volume. The opening to the interior volume is covered with a hingedly secured lid.

One problem with conventional cooler designs is the lack of workspace provided by the lid as well as the inability to utilize the lid during times of required access to the interior volume of the cooler. For many activities such as but not limited to picnic, meal ingredients are stored in a cooler for preparation of a meal or snack at the location where the cooler has been transported. Often times these meals can consist of many ingredients that require assembly in order to prepare the meal. Commonly, a user of a cooler will attempt to utilize the lid surface as a support surface to prepare and/or assemble the ingredients. This requires that all of the ingredients needed must be removed from the cooler which can be undesirable based on certain requirements to maintain some items at cooler temperatures as long a s possible. Additionally, when utilizing the lid of the cooler as a support surface, it inhibits access to the interior of the cooler for any item such as but not limited to a drink disposed therein.

It is intended within the scope of the present invention to provide a portable cooler that includes a plurality of integrated support tray members wherein the support tray members are configured to provide support for items such as but not limited to food items and drink containers.

SUMMARY OF THE INVENTION

It is the object of the present invention to provide a portable cooler that is configured to provide additional support surfaces for food and drink items wherein the cooler of the present invention includes four walls integrally formed with a body creating an interior volume to receive and store objects therein.

Another object of the present invention is to provide a portable cooler having integrated support tray members on the exterior surface of the walls thereof wherein the interior volume includes an opening wherein the opening is operably covered with a hingedly secured lid.

A further object of the present invention is to provide a portable cooler that is configured to provide additional support surfaces for food and drink items wherein the exterior surface of the side walls of the body of the cooler of the present invention include recesses formed therein.

Still another object of the present invention is to provide a portable cooler having integrated support tray members on the exterior surface of the walls thereof wherein the recesses are configured to receive the support tray member in its first position.

An additional object of the present invention is to provide a portable cooler that is configured to provide additional support surfaces for food and drink items wherein in the first position the support tray member is adjacent to the exterior surface of the wall of the body of the cooler.

Yet a further object of the present invention is to provide a portable cooler having integrated support tray members on the exterior surface of the walls wherein the support tray members are movable to a second position.

Another object of the present invention is to provide a portable cooler that is configured to provide additional support surfaces for food and drink items wherein in its second position the support tray members are extended outward from the walls of the cooler and are substantially perpendicular therewith.

An alternate object of the present invention is to provide a portable cooler having integrated support tray members on the exterior surface of the walls wherein the support tray members are operably coupled with a support member wherein the support member is movably coupled with wall of the cooler.

Still a further object of the present invention is to provide a portable cooler that is configured to provide additional support surfaces for food and drink items wherein the support member is configured to provide structural support for the support tray member in its second position.

An additional object of the present invention is to provide a portable cooler having integrated support tray members on the exterior surface of the walls wherein the support tray members can be provide in alternate shapes and further be configured to receive and retain various objects such as but not limited to stemmed glasses.

A further object of the present invention is to provide a portable cooler that is configured to provide additional support surfaces for food and drink items wherein the present invention further includes a handle and wheels operably coupled to the body.

An alternative objective of the present invention is to provide a portable cooler having integrated support tray members on the exterior surface of the walls wherein the support member extends substantially across the width of the support tray member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 3 is a detailed view of the body of the present invention; and FIG. 4 is a perspective view of the present invention with the support tray members and handle members in their first positions.

DETAILED DESCRIPTION

Figure 1:
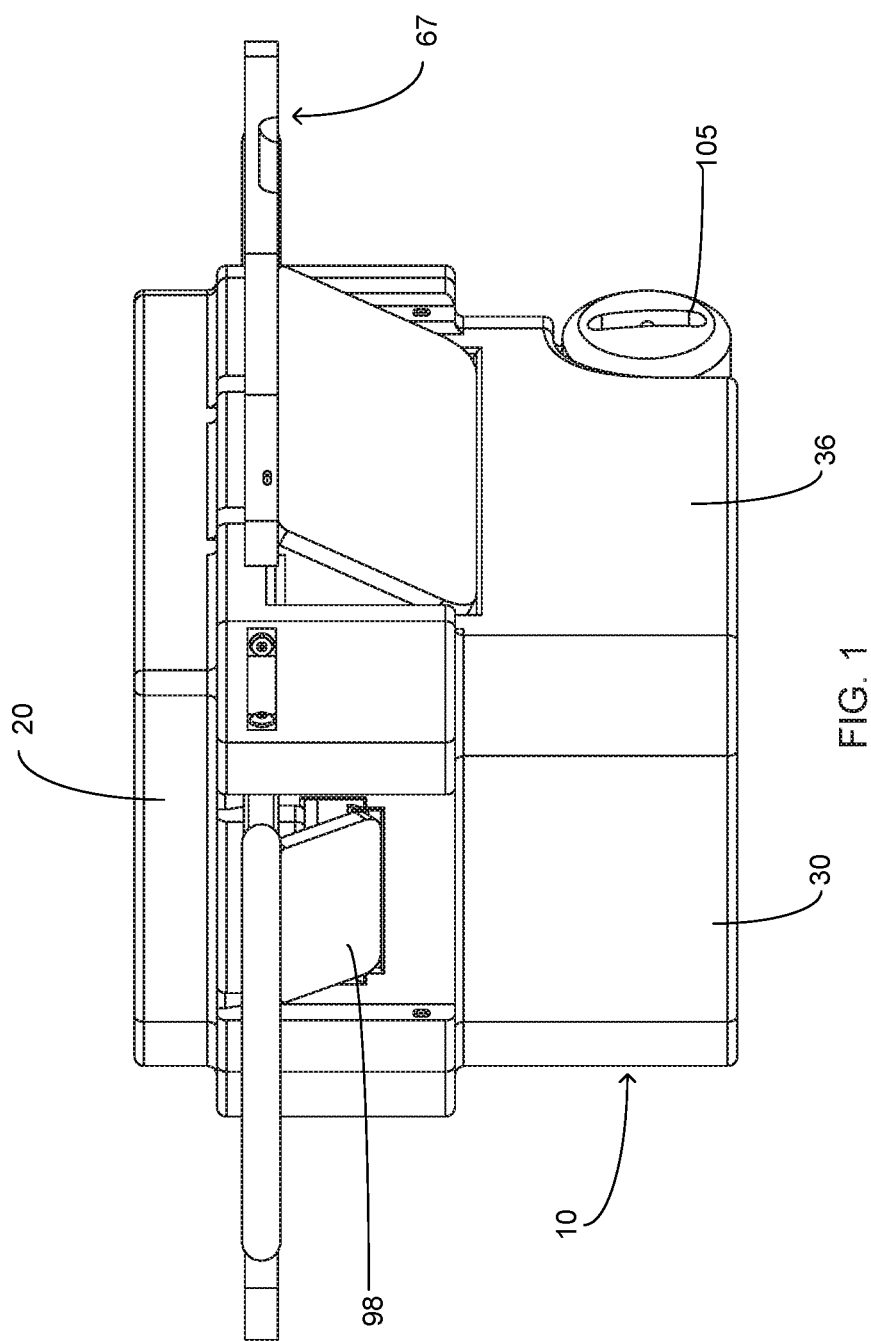
FIG. 1 is a side front view of the present invention.
Figure 2:
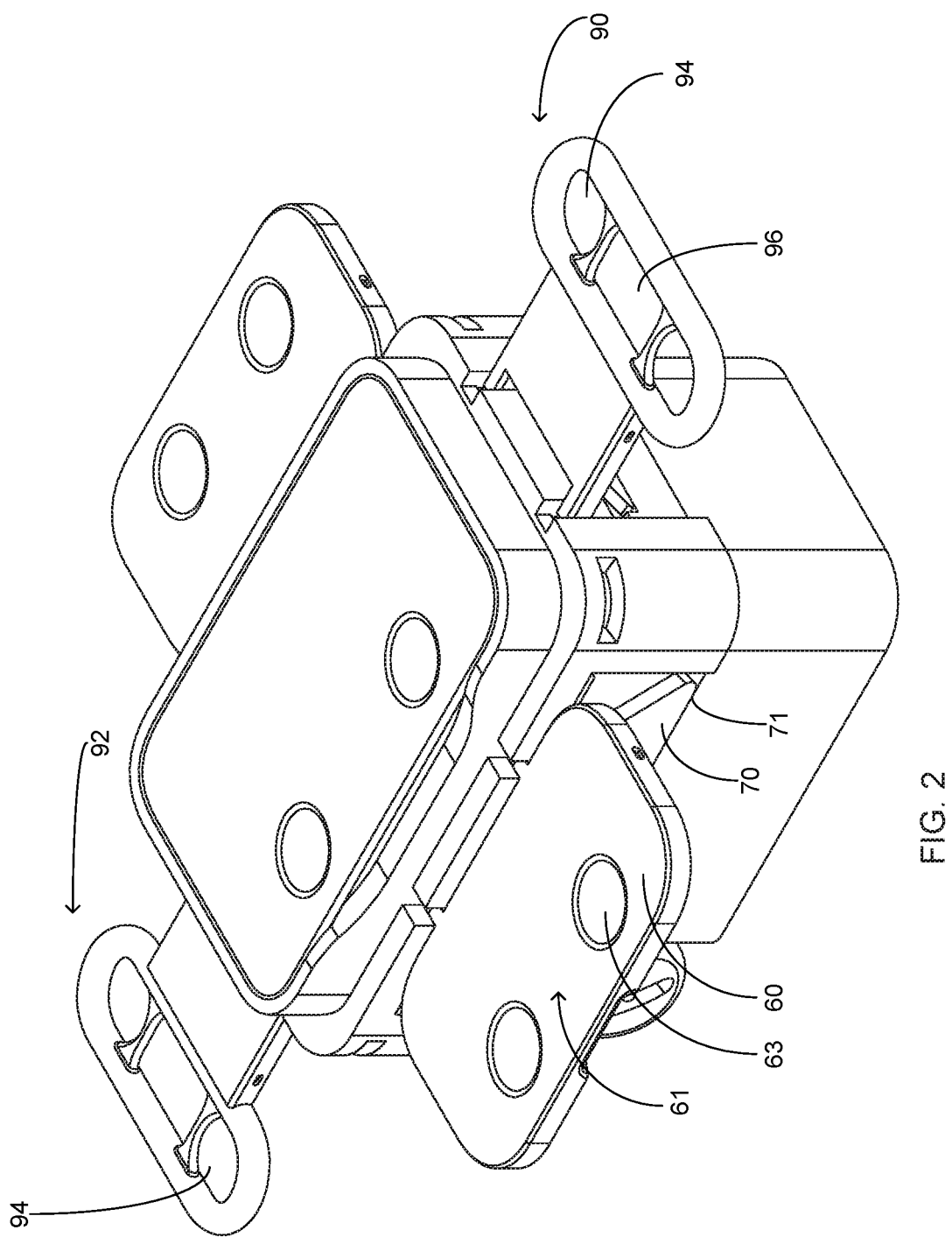
FIG. 2 is a perspective view of the present invention with the support tray members and handle members deployed in their second positions.

Referring now to the drawings submitted herewith, wherein various elements depicted therein are not necessarily drawn to scale and wherein through the views and figures like elements are referenced with identical reference numerals, there is illustrated a cooler with integrated support trays 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring now to the Figures submitted herewith, the cooler with integrated support trays 100 includes a body 10 wherein the body 10 is comprised of four walls 12 and a bottom 14 that are integrally formed to create an interior volume 16. While the cooler with integrated support trays 100 is illustrated herein as having four walls 12, it is contemplated within the scope of the present invention that the body 10 could be comprised of an alternate quantity of walls so as to provide an alternate shape for the cooler with integrated support trays 100. The interior volume 16 is accessible via opening 18 wherein the opening 18 includes a lid 20 providing coverage thereof. The lid 20 in a preferred embodiment is hingedly secured to the upper perimeter edge 21 of the four walls 12 and is operable to provide coverage of the opening 18. The body 10 is manufactured from a suitable durable material such as but not limited to plastic and is constructed so as to provide a temperature within the interior volume 16 that is different than its surroundings. It should be understood within the scope of the present invention that the cooler with integrated support trays 100 could be manufactured in various sizes and colors.

The four walls 12 consist of a front wall 30, a rear wall 32, a first side wall 34 and a second side wall 36. The first side wall 34 includes an exterior surface 37 wherein the exterior surface 37 includes a recess 40 formed therein. The recess 40 is defined by lateral perimeter walls 43,44 and an upper perimeter wall 46. The recess 40 is formed utilizing suitable techniques and as further discussed herein provides the necessary structure to accommodate a support tray member 60 in its first position. The upper perimeter wall 46 includes a first void 47 and a second void 48 formed therein. The first void 47 and second void 48 are operable to receive projections 50 of the support tray member 60. The projections 50 are hingedly secured within the first void 47 and second void 48 utilizing conventional fasteners such as but not limited to a metal pin. The projections 50 are hingedly secured within the first void 47 and second void 48 so as to provide the necessary structure that places the support tray member 60 within the recess 40 so as to ensure the exterior surface 61 of the support tray member 60 is substantially aligned with the exterior surface 37. While the recess 40 is illustrated herein as being substantially the size of the first side wall 34, it should be understood within the scope of the present invention that the recess 40, and as such the support tray member 60, could be provided in alternate sizes that occupy more or less of the first side wall 34. While the elements of the projections 50, the first void 47 and second void 48 are taught within the scope of the present invention to provide the hingeable movement and positioning of the support tray member 60, it is contemplated within the scope of the present invention that alternate elements could be utilized to provide the desired functionality as described herein.

The support tray member 60 is manufactured from a suitable durable rigid material and is movably coupled within the recess 40 of the first side wall 34. The support tray member 60 is movable intermediate a first position and a second position. The support tray member 60 in its first position, as illustrated herein, is folded into the recess 40 so as to be generally flush with the first side wall 34. In its second position, as illustrated herein, the support tray member 60 extends outward from the first side wall 34 and is generally perpendicular thereto. Indentations 63 can be formed in the exterior surface 61 of the support tray member 60 in order to provide support for objects such as but not limited to drink vessels. While the support tray member 60 is illustrated herein as being generally rectangular in shape, it should be understood within the scope of the present invention that the support tray member 60 is formed in a mateable shape with the recess 40 and could be formed in any size and shape that would mateably engage the recess 40 when the support tray member 60 is in its first position.

The support tray member 60 is operably coupled to support member 70. The support member 70 is constructed of a durable rigid material and is movably coupled within the recess 40 of the first side wall 34. The support member 70 is configured to provide the necessary structural support for the support tray member 60 in its second position. The support member 70 includes a lower edge 71 that is movably secured within groove 80. Groove 80 is formed in the recess 40 and extends substantially across the width thereof. The upper edge of the support member (not particularly illustrated herein) is operably coupled to the bottom surface 67 of the support tray member 60. It should be understood within the scope of the present invention that the lower edge 71 could be movably coupled within the groove 80 utilizing various alternate techniques and/or fasteners. The bottom surface 67 of the support tray member 60 includes a cavity (not particularly illustrated herein, wherein the cavity is operable to mateable receive the support member 70 when the support tray member 60 is in its first position so as to ensure the aforementioned desired position thereof. In its preferred embodiment the support member 60 extends substantially the width of the support tray member 60 and recess 40. A generally equal width of the support member 70 and support tray member 70 ensures a desired structural stability for the support tray member 60 permitting accommodation of either a heavier object(s) or force applied thereto.

While the first side wall 34 was utilized herein to describe the support tray member 60 and support member 70, it should be evident by the Figures submitted as a part hereof that the second side wall 36 has the identical configuration and elements as the first side wall 34. Furthermore, while the preferred embodiment has a support tray member 60 and the required element configuration to produce the desired results as discussed herein, it should be understood within the scope of the present invention that the cooler with integrated support trays 100 could be provided with as few as one support tray member 60 or more than four. It should also be understood within the scope of the present invention that the support tray member 60 could be provided in alternate configuration to provide specialized retention of objects such as but not limited to stemmed glasses.

The cooler with integrated support trays 100 further includes opposing handle members 90,92 movably coupled to the front wall 30 and rear wall 32 respectively. The handle members 90,92 are manufactured from a suitable rigid material and function to provide an interface for both transportation of the cooler with integrated support trays 100 as well as provide support for objects to be superposed thereon when the handle members 90,92 are extended in their second position which is equivalent to the second position described herein for the support tray member 60. The handle members 90,92 include formations 94 and aperture 96. Formations 94 while illustrated herein as being annular in shape, are designed to be formed to mateably receive objects such as but not limited to drinking vessels. Aperture 96 is formed intermediate formations 94 and provides an interface for a user's hand to engage the handle member 90,92. The handle members 90, 92 are operably coupled with support members 98 wherein support members 98 are formed and structured like the support member 70 so as to provide the identical functionality.

The cooler with integrated support trays 100 further can include wheels 105. It is contemplated within the scope of the present invention that the wheels could be provided in alternate sizes and manufactured from various suitable materials.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A portable cooler comprising:
   a body, said body having at least one wall and a bottom configured to form an interior volume, said interior volume having an opening so as to provide access thereto, said at least one wall having an exterior surface, said body further including a lid member, said lid member configured to cover said opening;
   a recess, said recess being formed in the exterior surface of said at least one wall;
   a support tray member, said support tray member being operably coupled to said at least one wall, said support tray member being movable intermediate a first position and a second position, said support tray member being mateably shaped with said recess, wherein in its second position said support tray member is extending outward from said at least one wall and is perpendicular thereto;
   a support member, said support member being operably coupled to said at least one wall and said support tray member, said support member configured to support said support tray member in its second position and wherein said support member has a width that is substantially equal to that of the support tray member;
   a handle member, said handle member movably coupled to said at least one wall, said handle member being movably between a first and second position wherein in said second position said handle member is perpendicular to said at least one wall; and
   wherein in said first position said support tray member is mateably engaged with said recess and adjacent said at least one wall of said body.

2. The portable cooler as recited in claim 1, wherein said handle member further includes at least one formation and at least one aperture, wherein said at least one formation is shape so as to mateably receive an object of a similar shape.

3. A portable cooler wherein the portable cooler comprises:
   a body, said body having a plurality of walls and a bottom integrally formed to create an interior volume, said body having an upper end and a lower end, said interior volume having an opening providing access thereto, said body further having a lid secured to said upper end, said lid configured to cover said opening, said plurality of walls having a exterior surface;

a plurality of recesses, said plurality of recesses being formed on the exterior surface of said plurality of walls, said plurality of recesses having a width being defined by lateral perimeter walls, said plurality of recesses having an upper perimeter wall;

a plurality of support tray members, said plurality of support tray members being operably coupled within said plurality of recesses, said plurality of support tray members being mateably shaped with said plurality of recesses, said plurality of support tray members being movable between a first position and a second position, said plurality of support tray members having an upper surface and a lower surface;

a plurality of support members, said plurality of support members being operably coupled to the exterior surface of said plurality of walls and said lower surface of said plurality of support tray members, said plurality of support members configured to provide structural support for said plurality of support tray members in their second position, wherein said plurality of support members include an upper edge and a lower edge, said lower edge being operably coupled to said recess proximate a lower end thereof, said upper edge being operably coupled to said lower surface of said plurality of support trays.

4. The portable cooler as recited in claim 3, wherein said plurality of recesses further include a groove, said groove extending across the width of said plurality of recesses, said lower edge of said plurality of support members being operably coupled to said groove.

5. The portable cooler as recited in claim 4, wherein said plurality of support members are angled outward from said plurality of walls when said plurality of support tray members are placed in said second position.

6. The portable cooler as recited in claim 5, wherein in said first position said plurality of support members are adjacent said plurality of walls.

7. The portable cooler as recited in claim 6, wherein in said first position, said plurality of support members are disposed within a cavity formed on the lower surface of said plurality of support members.

8. The portable cooler as recited in claim 7, and further including at least one handle member, wherein said at least one handle member further includes at least one formation and at least one aperture, wherein said at least one formation is shape so as to mateably receive an object of a similar shape, said at least one handle member being movable between a first position and a second position wherein said second position said at least one handle member is perpendicular to said body.

9. The portable cooler as recited in claim 8, wherein said upper surface of said plurality of support tray members has formed thereon at least one indentation, said at least one indentation shaped to receive an object of a similar shape.

10. A portable cooler wherein the portable cooler comprises:

a body, said body having four walls and a bottom integrally formed to create an interior volume, said body having an upper end and a lower end, said interior volume having an opening providing access thereto, said body further having a lid secured to said upper end, said lid configured to cover said opening, said four walls having a exterior surface;

four recesses, said four recesses being formed on the exterior surface of said four walls, said four recesses having a width being defined by lateral perimeter walls, said four recesses having an upper perimeter wall, said upper perimeter wall having a first void and a second void;

two support tray members, said two support tray members being operably coupled within two of said four recesses, said two support tray members being mateably shaped with said two of said four recesses, said two support tray members being movable between a first position and a second position, said plurality of support tray members having an upper surface and a lower surface, said two support trays having a rear edge, said rear edge further having two projections formed thereon extending outward therefrom; said two projections being hingedly secured within said first void and said second void;

four support members, said four support members being operably coupled to the exterior surface of said four walls, said four support members having a first position and a second position, said four support members having an upper edge and a lower edge, two of said four support members being operably coupled to the and said lower surface of said two support tray members, said four support members configured to provide structural support for said plurality of support tray members in their second position.

11. The portable cooler as recited in claim 10, two handle members, said two handle members being movably coupled to opposing ends of said body, said two handle members being operably coupled to two of said four support members, said two handle members being movable between a first position and a second position.

12. The portable cooler as recited in claim 11, wherein said four recesses include a groove proximate a lower end thereof, said groove extending the width of said four recesses, said groove configured to operably couple with said lower edge of said four support members.

13. The portable cooler as recited in claim 12, wherein said two support tray members further include a cavity in said lower surface, said cavity configured to mateably couple with two of said four support tray members.

14. The portable cooler as recited in claim 13, wherein said four support members are angled away from said body in said second position wherein said upper edge is distal to said body and said lower edge is proximate said body.

15. The portable cooler as recited in claim 14, wherein said upper surface of said two support tray members has formed thereon at least one indentation, said at least one indentation shaped to receive an object of a similar shape.

* * * * *